Feb. 19, 1935.  G. FAUSER  1,991,452
PROCESS FOR THE PREPARATION OF CONCENTRATED NITRIC
ACID STARTING FROM THE OXIDATION OF AMMONIA
Filed Dec. 3, 1929
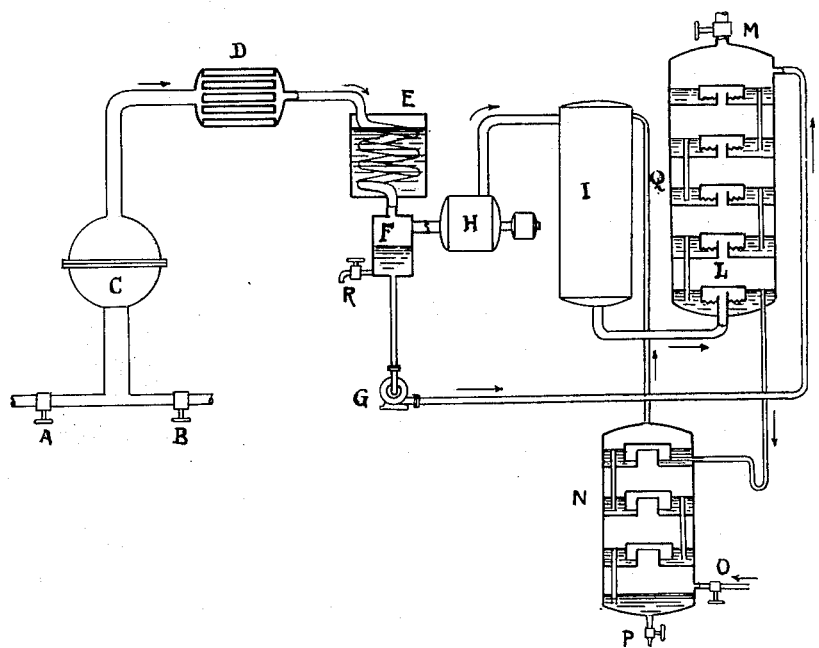
Inventor
Giacomo Fauser
By Knight
Attorneys Patented Feb. 19, 1935

1,991,452

UNITED STATES PATENT OFFICE 1,991,452

PROCESS FOR THE PREPARATION OF CONCENTRATED NITRIC ACID STARTING FROM THE OXIDATION OF AMMONIA

Giacomo Fauser, Novara, Italy, assignor to Montecatini, Società Generale Per L'Industria Mineraria Ed Agricola, Milan, Italy, a joint-stock company of Italy Application December 3, 1929, Serial No. 411,369
In Italy February 27, 1929

3 Claims. (Cl. 23—162)

It is well known that in the processes heretofore in use for converting ammonia into nitric acid an acid is obtained, the concentration of which is 36° Bé. at the most, that is to say, containing about 50% $HNO_3$. This concentration approximately corresponds to equilibrium when working at atmospheric pressure with a temperature of the order of 20° to 30° C. and with gases containing 10 to 12% NO with no addition of oxygen.

It is also well known that, when liquid $N_2O_4$ is caused to react with water and oxygen under pressure, concentrated nitric acid can be obtained according to the reaction

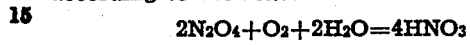
$$2N_2O_4 + O_2 + 2H_2O = 4HNO_3$$

If however the nitrous oxides are obtained through catalytic oxidation of ammonia by atmospheric oxygen, the amount of water forming in the combustion is far greater than the amount required by the reaction and consequently no concentrated acid can be obtained. That is to say, it appears from the equation:

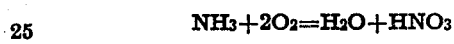
$$NH_3 + 2O_2 = H_2O + HNO_3$$

that it would theoretically be possible to produce an acid concentrated to 77% as a maximum but, bearing in mind that the efficiency of the conversion ranges about 90% it will be seen that the actual concentration will be lower than the theoretical one.

The object of the present invention is to attain a production of concentrated nitric acid starting from the oxidation of ammonia.

It is known that the conversion of nitrogen oxides into nitric acid by absorption with water is the quicker according as the pressure is greater. As the compression of the mixture of nitrogen oxides saturated with moisture is not practicable in an ordinary compressor due to the strong corrosive action of such gases on ordinary metals and on lubricants, it has been already proposed to carry out the ammonia oxidation direct under pressure. It has been found, however, that the efficiency of the oxidation under pressure is appreciably lower than the efficiency of the oxidation carried out at atmospheric pressure; this is explained by the fact that the oxidation reaction:

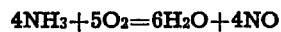
$$4NH_3 + 5O_2 = 6H_2O + 4NO$$

takes place with an increase in volume.

The present invention supplies a means of overcoming this difficulty; the means consists in carrying out the oxidation of ammonia at atmospheric pressure, in condensing the aqueous vapors by cooling, and in compressing the nitrous gases in a special turbo-compressor made of high chromium steel.

The accompanying drawing is a diagram of the process, it being understood however that the invention is not confined to the details shown on the drawing.

Air and ammonia are conveyed in the desired proportions through the regulating valves A and B into the oxidation chamber C where ammonia, in contact with a suitable catalyzer, combines with the oxygen and gives rise to nitrous oxides and aqueous vapor. On leaving the oxidation chamber at a high temperature, the gases flow into the boiler D, from whence they pass into the cooler E, there to be further cooled.

The volume of the boiler as well as of the cooler must be small relatively to the transmission surface; under these conditions the NO has no time to be oxidized and converted into $NO_2$ and cannot therefore react with water. In the vessel F, a very small amount of nitric acid separates with the water of condensation, whereas the nitrous gases are drawn off by the turbo-compressor H and forced under pressure into the oxidation chamber I. The quick transformation of NO into $NO_2$ is facilitated by the presence of oxygen supplied by the tube Q.

The chamber I is subjected to a cooling action, and this is of assistance in the conversion of $NO_2$ to $N_2O_4$. Through the cock R, the excess water can be removed, while through the centrifugal pump G the water amount requisite to react with the nitrous gases is conveyed to the top of the absorption column L, which, too, is subjected to an intense cooling action.

The liquid discharging through the overflow pipes circulates through the underlying chambers, while the gases rising from the bottom of the column L are bubbled through the liquid. Under these conditions the nitrogen oxides completely solve in the water owing to the low temperature and high pressure.

The residual gases leave the absorption column through the valves M.

The liquid leaving the column L at the bottom is dilute nitric acid containing nitrogen oxides in solution. This liquid is conveyed into the reaction column N, the latter being at a temperature of 50° to 60° C., and brought into contact with compressed oxygen entering through cock O.

Under the described circumstances, the dissolved nitrogen oxides react with the residual water and with the oxygen, and give rise to the formation of concentrated nitric acid, which can be extracted through the cock P. The excess oxygen is conveyed through pipe Q into the oxidation chamber I.

Having now particularly described and ascertained the nature of my said invention and in what manner the same is to be performed, I declare that what I claim is:

1. The process for producing concentrated nitric acid comprising the oxidizing of ammonia at atmospheric pressure in the presence of a suitable catalyzer, condensing and segregating the aqueous vapors resulting from the reaction, compressing the nitrous oxides resulting from such oxidation, mixing the resulting nitrogen oxides with water at a low temperature and oxidizing the products of such mixture with compressed oxygen at a higher temperature.

2. A process for the production of concentrated nitric acid, which comprises oxidizing ammonia; absorbing the nitrogen oxides so formed, at a low temperature and under pressure, in such a quantity of water as to form a solution of nitric acid containing nitrogen oxides; and, while retaining said solution under pressure, reacting the same with oxygen at a higher temperature, in such a way that the water and nitrogen oxides interreact, thus increasing the nitric acid concentration.

3. A process for the production of concentrated nitric acid which comprises oxidizing ammonia; bringing the nitrogen oxides so formed into contact with oxygen in order to convert them into higher oxides; absorbing the nitrogen oxides so formed, at a low temperature and under pressure, in such a quantity of water as to form a solution of nitric acid containing nitrogen oxides; reacting said solution with oxygen at a higher temperature while still under pressure, in such a way that the water and the nitrogen oxides interreact, thus increasing the nitric acid concentration; and utilizing the excess oxygen from said last reaction for said second-mentioned oxidation wherein the nitrogen oxides are converted to higher nitrogen oxides.

GIACOMO FAUSER.